US012309485B2

(12) United States Patent
Duffy et al.

(10) Patent No.: US 12,309,485 B2
(45) Date of Patent: May 20, 2025

(54) SYSTEMS AND METHODS FOR ASSISTIVE VIDEO CAPTURE

(71) Applicant: Photon Ventures Inc., Garden Valley, CA (US)

(72) Inventors: Peter Anthony Duffy, Garden Valley, CA (US); Louis Norman, III, Sacramento, CA (US)

(73) Assignee: Photon Ventures Inc., Garden Valley, CA (US)

( * ) Notice: Subject to any disclaimer, the term of this patent is extended or adjusted under 35 U.S.C. 154(b) by 170 days.

(21) Appl. No.: 18/449,256

(22) Filed: Aug. 14, 2023

(65) Prior Publication Data

US 2025/0063250 A1 Feb. 20, 2025

(51) Int. Cl.
*H04N 23/60* (2023.01)
*H04N 23/63* (2023.01)
*H04N 23/695* (2023.01)

(52) U.S. Cl.
CPC .......... *H04N 23/64* (2023.01); *H04N 23/631* (2023.01); *H04N 23/634* (2023.01); *H04N 23/695* (2023.01)

(58) Field of Classification Search
CPC .... H04N 23/634; H04N 23/64; H04N 23/695; H04N 23/631
USPC .................................................... 348/333.04
See application file for complete search history.

(56) References Cited

U.S. PATENT DOCUMENTS

| | | | |
|---|---|---|---|
| 9,374,517 B2* | 6/2016 | Glasgow | H05K 7/1492 |
| 9,866,767 B2 | 1/2018 | Jones | |
| 10,412,300 B2 | 9/2019 | Duffy | |
| 10,685,679 B1* | 6/2020 | Bhuruth | G06T 19/003 |
| 10,944,955 B2* | 3/2021 | Koyama | G06V 20/46 |
| 11,290,638 B1 | 5/2022 | Duffy | |
| 11,666,385 B2* | 6/2023 | Feiner | G16H 40/63 |
| | | | 600/424 |
| 11,869,135 B2* | 1/2024 | Holzer | H04N 13/282 |
| 11,917,289 B2* | 2/2024 | Shreve | G06V 10/774 |
| 12,038,297 B2* | 7/2024 | Buddharaju | G05D 1/0022 |
| 12,250,461 B2* | 3/2025 | Hu | H04N 23/69 |
| 2014/0104379 A1 | 4/2014 | Glasgow | |
| 2016/0117817 A1 | 4/2016 | Seel | |
| 2016/0227133 A1* | 8/2016 | Jones | H04N 23/64 |
| 2016/0275666 A1 | 9/2016 | Okuyama | |
| 2019/0098205 A1* | 3/2019 | Duffy | H04N 23/64 |

(Continued)

*Primary Examiner* — Pritham D Prabhakher
(74) *Attorney, Agent, or Firm* — Ansari Katiraei LLP; Arman Katiraei; Sadiq Ansari

(57) ABSTRACT

Disclosed is a system and associated methods for assistive video capture. The system is implemented using one or more sensors that are associated with and track movements of a video capture device. The system selects a three-dimensional ("3D") path that defines 3D positional movements for guiding a video capture of a target object from different positions. The system tracks movements of the video capture device based on sensor data. The system compares the movements of the video capture device at different times of the video capture to positions that are specified for the video capture at those different times by different sets of the positional movements, and updates a user interface according to the movements of the video capture device following or deviating from the different positions that are specified for the video capture at the different times.

20 Claims, 6 Drawing Sheets

(56) References Cited

U.S. PATENT DOCUMENTS

| | | | |
|---|---|---|---|
| 2019/0191146 A1* | 6/2019 | Koyama | H04N 5/222 |
| 2020/0168252 A1* | 5/2020 | Bhuruth | G11B 27/34 |
| 2020/0188028 A1* | 6/2020 | Feiner | G16H 50/50 |
| 2021/0302189 A1 | 9/2021 | Buddharaju et al. | |
| 2022/0108447 A1 | 4/2022 | Kayser et al. | |
| 2023/0403459 A1* | 12/2023 | Shreve | G06V 20/20 |

* cited by examiner

SYSTEMS AND METHODS FOR ASSISTIVE VIDEO CAPTURE

BACKGROUND

Assistive photography tools are available to aid users in capturing high-quality and consistent photographs of goods. Assistive photography tools may provide a static wireframe or other static guide in a viewfinder or display to identify an ideal angle, distance, and/or orientation from which to photograph a certain good. The user repositions their camera until the good is aligned with the static guide and captures the image.

These same assistive photography tools have no application for video capture and cannot be used to generate professional high-quality and consistent videos of goods. Videos involve motion and continually changing angles, distances, and/or orientations from which different parts of the same good are captured in a sequence or order. The static wireframes and/or static guides of the assistive photography tools allows for a single image to be aligned and captured at one time rather the evolving capture of the different parts of the same good over a continuous time frame.

DETAILED DESCRIPTION OF PREFERRED EMBODIMENTS

Figure 1:
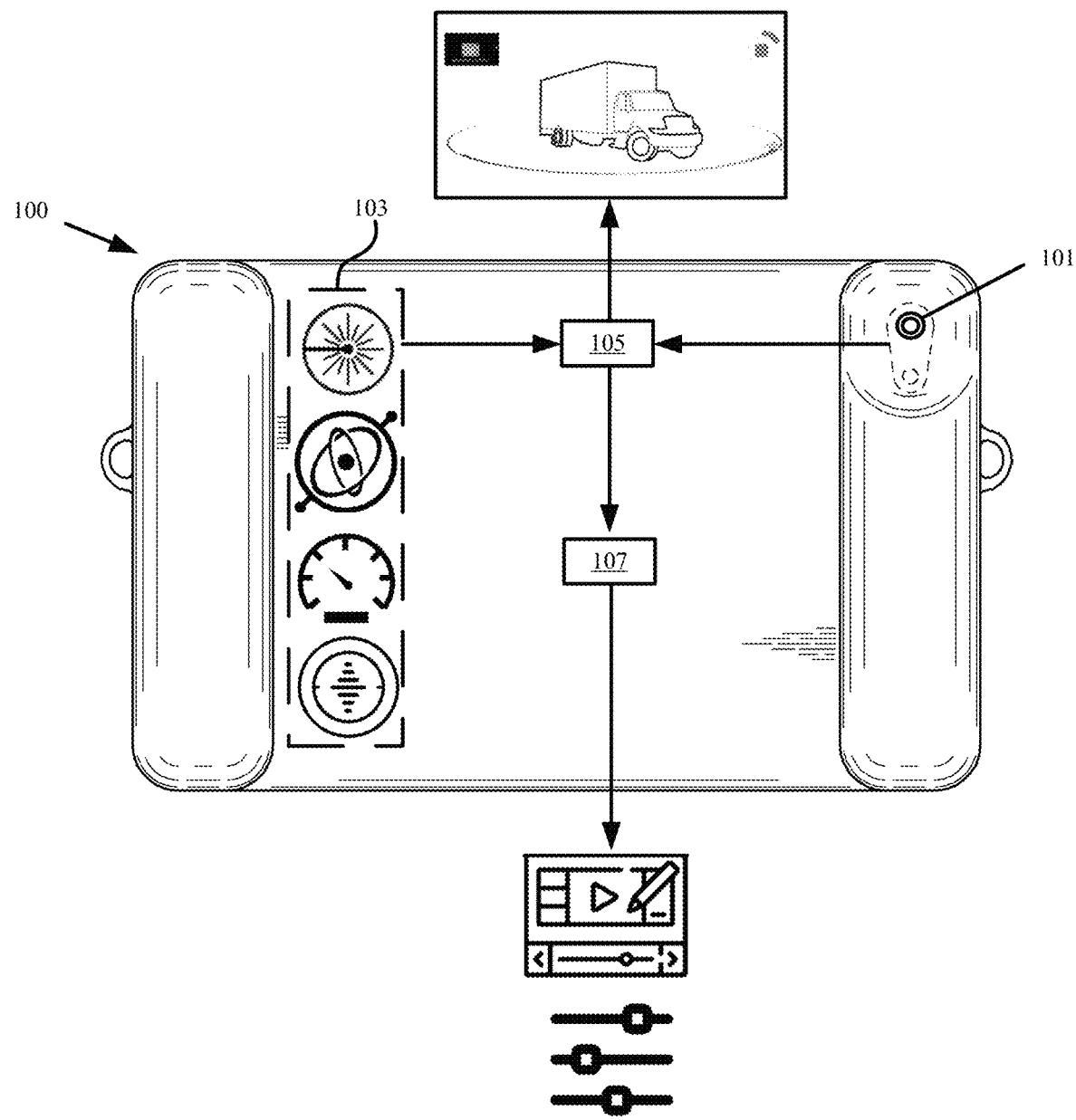
FIG. 1 illustrates hardware components of a video capture system in accordance with some embodiments presented herein.

The following detailed description refers to the accompanying drawings. The same reference numbers in different drawings may identify the same or similar elements.

Provided are systems and methods for assistive video capture. The assistive video capture provides a continuously evolving three-dimensional ("3D") path for the guided and/or controlled video capture of different parts of a target object over a period of time. The assistive video capture continuously adjusts the 3D path based on a real-time tracking of the video capture device that is used for the video capture. The assistive video capture continually compares the tracked movements of the video capture device against positional movements that are defined at different parts of the 3D path, and provides real-time positional adjustments for returning the video capture to the plotted 3D path.

The assistive video capture is implemented by a video capture system. The video capture system includes a video capture device and various sensors tracking the movement, tilt, orientation, and/or other positional attributes of the video capture device.

The video capture system acquires positional measurements from the sensors and/or performs real-time image analysis of the video that is captured by the video capture device. The video capture system provides dynamic guidance and/or performs dynamic control over the video capture of an object based on the sensor data and/or image analysis. The dynamic guidance and/or control may include generating an augmented reality view or a user interface ("UI") on the viewfinder or display of the video capture device that provides a 3D path for the user to follow in order to capture a video that presents the object from a choreographed and/or desired sequence of positions, angles, orientations, and/or perspectives with a particularly timed progression. The dynamic guidance and/or control may further include tracking the speed of movement, distance, tilt, orientation, and/or other positional attributes of the video capture device relative to the object and the generated 3D path, and providing visual alerts when the tracked positional attributes deviate from the progression defined in the 3D path by various threshold amounts.

In some embodiments, the video capture system performs the assistive video capture by dynamically postprocessing a video that was captured according to the dynamic guidance and/or control provided via the 3D path and visual alerts. The dynamic postprocessing may include detecting frames within the video that were captured with the video capture device at a position that deviated from the desired 3D path, and adjusting the detected frames to conform with the desired 3D path. Adjusting the detected frames may include slowing down or speeding up the frame rate for a set of frames in the video where the movement of the video capture device did not align with the speed of movement specified by the 3D path for that segment of the video. Adjusting the detected frames may also include cropping frames of the video when the height of the video capture device differed from the height defined in the desired 3D path, zooming in or zooming out of a set of frames when the positioning or distance of the video capture device for that set of frames differed from the positioning or distance defined in the desired 3D path, and/or performing other positional, rotational, or visual characteristic (e.g., color, brightness, saturation, etc.) adjustments to individual frames that were captured when the video capture device was misaligned with the plotted 3D path.

The video capture system may also generate a composite video by stitching different videos that were captured for the same object by following different 3D paths into a single video presentation of that object. Generating the composite video may include ordering the different videos according to a defined presentation sequence, defining transitions between videos, and/or adjusting the videos for consistent brightness, coloring, and/or other visual characteristics in the presentation of the captured object.

FIG. 1 illustrates hardware components of video capture system 100 in accordance with some embodiments presented herein. The hardware components may be physically integrated in a single unit or may be implemented in different units or devices that are communicably coupled to video capture system 100.

Video capture system 100 includes video capture device 101, sensors 103, guidance controller 105, and/or video postprocessor 107. In some embodiments, video capture system 100 includes additional or fewer hardware components and/or elements. In some embodiments, video capture system 100 is implemented using the sensors, processor, display, and/or other hardware components of a tablet, smartphone, laptop computer, desktop computer, and/or other computing device with sensors and a video capture device.

Video capture device 101 corresponds to an imaging sensor that records video. Video capture device 101 may adapt a camera for the rapid capture of images (e.g., 30 images per second) that become the video.

Sensors 103 track various positional attributes of video capture device 101 and/or of video capture device 101 relative to the object being imaged or recorded by video capture device 101. Sensors 103 may include gyroscopes, accelerometers, inertial measurement units, Light Detection and Ranging ("LiDAR") sensors, depth sensors, and/or other positional and/or distance sensors. Sensors 103 may continually measure and/or track the tilt, orientation, and/or rotation of video capture device 101, movement of video capture device 101 in 3D space, and/or the distance between video capture device 101 and a target object.

Guidance controller 105 is configured with different 3D paths for the professional, high-quality, and consistent video capture of different objects. For instance, different 3D paths may be defined for the video capture of different types of vehicles, furniture, homes, people, and/or various physical goods.

Each 3D path may be defined with a starting point that is fixed relative to a point-of-reference or initial shot of a target object that is to be filmed or captured according to that 3D path. For instance, the starting point may include locating a specific element, feature, or point-of-reference of the target object at a particular position and/or with a particular orientation in the initial frame of the video. Similarly, the initial shot defined for the starting point of the 3D path may include positioning and/or orientating the target object in an initial frame of the video before starting the video capture of the target object. Accordingly, the starting point may be defined with a visual marker, wireframe, or outline of how the target object is to be positioned and/or orientated in the initial frame of the video.

Each 3D path may also be defined with set of 3D positional movements. The 3D path may specify transitions between the set of 3D positional movements with a consistent or varying rate. Each 3D positional movement from the set of 3D positional movements may be defined with a position in 3D space that is offset from the starting point and with an orientation for video capture device 101 at that offset position. In other words, the set of 3D positional movements may be defined relative to the starting point of the 3D path, and each 3D positional movement may specify an additional offset from the starting point that involves moving to a new position in 3D space relative to the starting point or a last position and/or changing the video capture device orientation at the new position.

Figure 2:
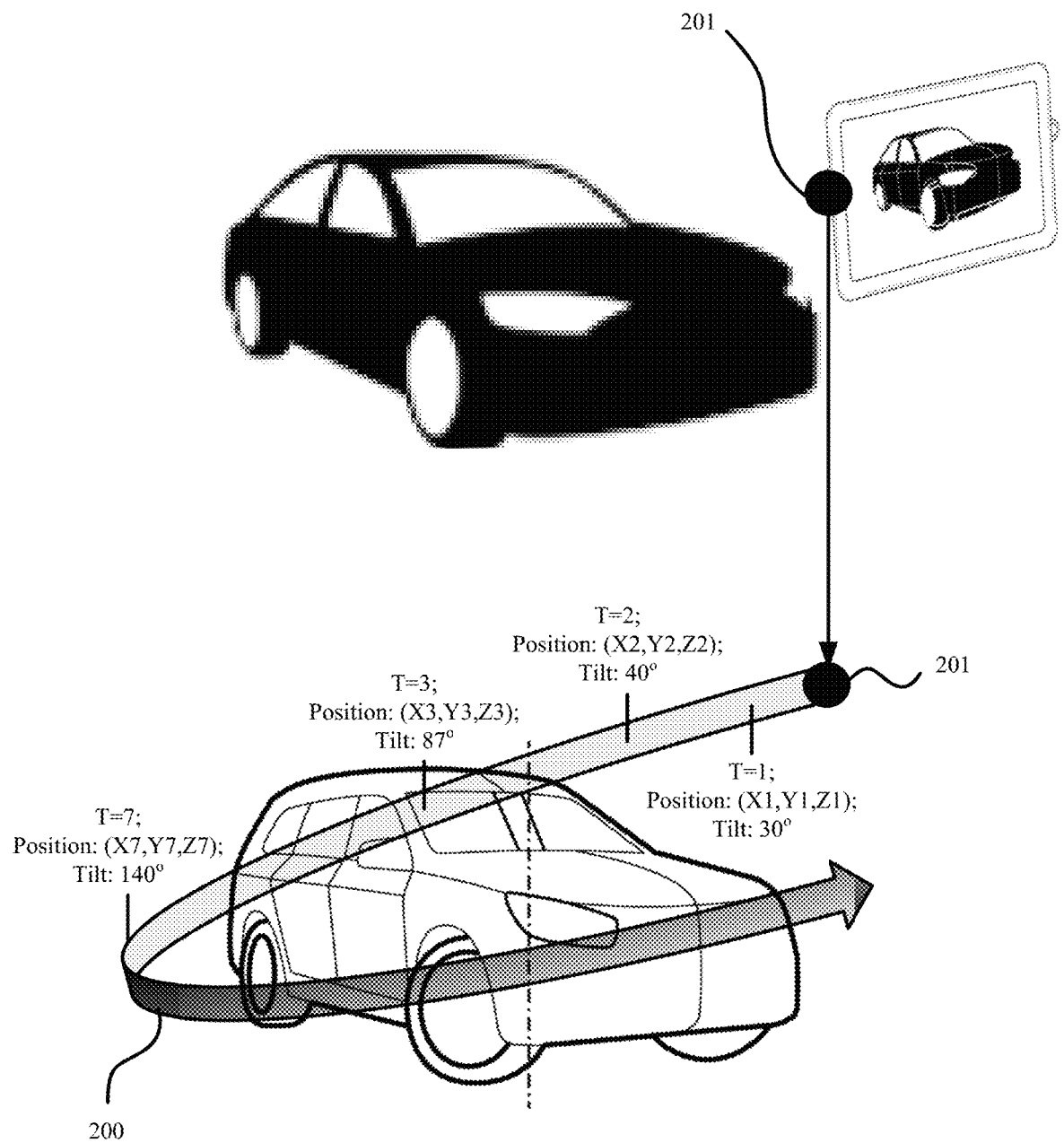
FIG. 2 illustrates an example three-dimensional ("3D") path that is defined for the video capture of a particular object in accordance with some embodiments presented herein.

FIG. 2 illustrates an example 3D path 200 that is defined for the video capture of a particular object in accordance with some embodiments presented herein. Example 3D path 200 may be a curved, non-linear, straight, or other set of 3D positional movements that commence from starting point 201 and that may be defined relative to starting point 201. Video capture system 100 may define starting point 201 relative to a wireframe, outline, or other guide that shows the particular object at a particular distance, angle, and/or position relative to video capture device 101. The wireframe, outline, or other guide may be presented on a display or viewfinder of video capture system 100, and when the wireframe, outline, or other guide presented on the display or viewfinder is aligned with the particular object, then video capture system 100 is determined to be at starting point 201.

The set of 3D positional movements may specify a sequence of different positions and distances for video capture device 101 relative to the particular object and/or starting point 201. The set of 3D positional movements further may specify a speed or time with which to transition between different 3D positional movements of the set of 3D positional movements, and a tilt, angle, or orientation for video capture device 101 at the position associated with each 3D positional movement. The set of 3D positional movements may be visually represented based on the changing curvature, tilt, and extension of example 3D path 200. For instance, example 3D path 200 may rotate at a first position to indicate that video capture device 101 should be rotated in a similar manner upon reaching that first position, may curve from back to front along a first section to indicate that video capture device 101 should be moved along a similar trajectory when the video capture reaches that first section of example 3D path 200, and/or may raise or lower along a second section to indicate that video capture device 101 should be raised or lowered by the represented amount when the video capture reaches that second section of example 3D path 200.

Guidance controller 105 presents a 3D path on a display or viewfinder of video capture system 100. Specifically, guidance controller 105 receives a 3D path that is selected for the video capture of a particular object. Guidance controller 105 analyzes images that are captured by video capture device 101 to set the 3D path on the defined starting point for the particular object. In some embodiments, guidance controller 105 presents a wireframe, outline, or other guide that shows the starting point for the 3D path, and the user repositions video capture device 101 so that the particular object becomes aligned with the presented wireframe, outline, or other guide.

Guidance controller 105 receives the measurements and/or other outputs produced by sensors 103 and/or images captured by video capture device 101 to determine when the target object is aligned with the starting point of the selected 3D path. In some embodiments, guidance controller 105 provides a visual, textual, or audible queue when video capture device 101 is aligned with the starting point for the selected 3D path. For instance, guidance controller 105 may analyze sensor 103 measurements to determine when video capture device 101 is the proper distance from the particular object, at the proper position (e.g., height, angle, etc.) relative to the particular object, and/or has the proper orientation (e.g., tilt or rotation) relative to the particular object.

Guidance controller 105 tracks the movements of video capture device 101 based on sensor 103 measurements, and compares the movements relative to the selected 3D path. Guidance controller 105 determines if video capture device 101 follows the set of 3D positional movements defined for the selected 3D path. In response to determining that the tracked movements of video capture device 101 deviate from the set of 3D positional movements defined for the selected 3D path, guidance controller 105 may generate alerts that visually, textually, or audibly notify the user of the 3D path deviation and that guide or control video capture device 101 back into alignment with the selected 3D path.

The alerts generated by guidance controller 105 may include visual notifications that are presented in real-time on the display of video capture system 100. For instance, guidance controller 105 may change the color of the 3D path that is presented on the display when the movements of video capture device 101 deviate from the selected 3D path. In some embodiments, guidance controller 105 may provide visual and/or audible queues that identify the deviations and corrective actions for repositioning video capture device 101 back on the selected 3D path. For instance, guidance controller 105 may notify the user that video capture device 101 is being moved too fast, is tilted in the wrong direction, is elevated off the selected 3D path, is too far or too close to the particular object, and/or has other deviations from the positioning and/or orientation specified for the particular time in the video capture by the selected 3D path. In some embodiments, guidance controller 105 compares sensor 103 measurements against a position and orientation that is specified for a current 3D positional movement in the progression through the set of 3D positional movements, and may generate specific positional adjustments to video capture device 101 that correct for the deviations from the selected 3D path. For instance, guidance controller 105 may present onscreen prompts during the video capture of the particular object. The onscreen prompts instruct the user that video capture device 101 should be tilted by a specified number of degrees in a particular direction to correct for an orientation deviation from the selected 3D path, or that video capture device 101 should be moved a certain distance to the left and up to correct for a detected positional deviation from the selected 3D path.

Video postprocessor 107 receives the video of the particular object that is generated by video capture device 101, and compares the video to the set of 3D positional movements defined for the 3D path that was selected for that video. Video postprocessor 107 may perform image analysis to determine when the movements of the particular object in the video frames deviate from the defined movements for the set of 3D positional movements. Video postprocessor 107 may adjust individual frames of the video where the movement of video capture device 101 relative to the particular object is determined to deviate from the defined movements for the set of 3D positional movements. Adjusting an individual frame may include adjusting the speed or rate at which that frame is presented in the video to slow or speed up different parts of the video. Adjusting an individual frame may also include cropping different parts of the individual frame or zooming in or out from the individual frame so that the positioning of the particular object in the individual frame matches the specified positioning for the particular object in the corresponding 3D positional movement defined for that individual frame.

Figure 3:
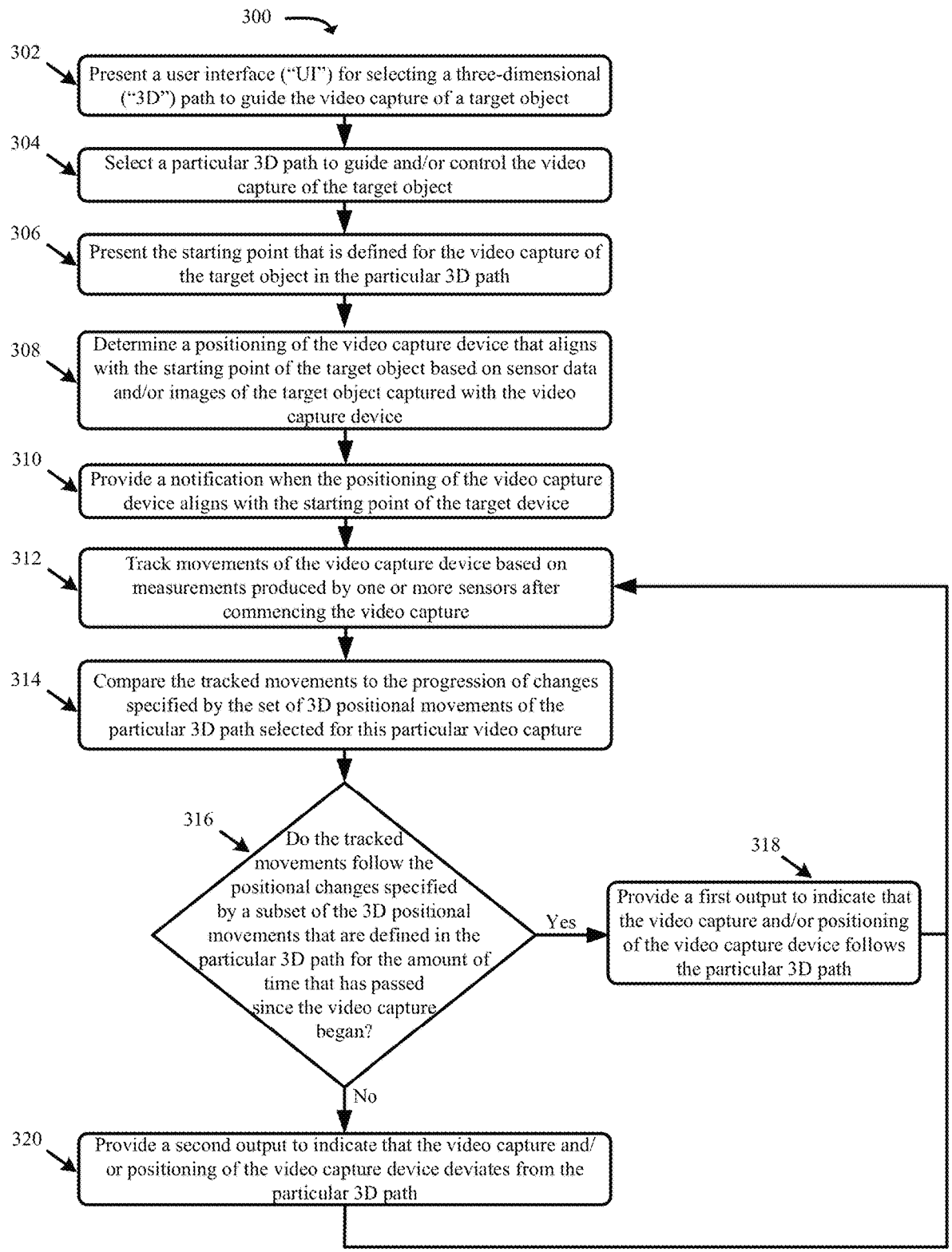
FIG. 3 presents a process for the assistive video capture that guides and/or controls the video capture of a particular object in accordance with some embodiments presented herein.

FIG. 3 presents a process 300 for the assistive video capture that guides and/or controls the video capture of a particular object in accordance with some embodiments presented herein. Process 300 is implemented by video capture system 100, and more specifically, by guidance controller 105 of video capture system 100.

Process 300 includes presenting (at 302) a UI for selecting a 3D path to guide the video capture of a target object. The UI may include drop-down boxes or fields for identifying the target object. For instance, the make and model of a vehicle may be entered into the UI, and video capture system 100 may select the 3D path that is defined for the professional, high-quality, and consistent video capture of that vehicle. In some embodiments, presenting (at 302) the UI may include activating video capture device 101 to scan or capture a serial number, bar code, quick response ("QR") code, or other identifier of the target object. Video capture system 100 may retrieve additional identifying information about the target object from the scanned identifier. Based on the scanned identifier and/or additional identifying information retrieved using the scanned identifier, video capture system 100 may present one or more 3D paths that are defined for the video capture of the identified object in the UI. Alternatively, video capture system 100 may automatically select the one or more 3D paths that are associated with the scanned identifier.

Process 300 includes selecting (at 304) a particular 3D path to guide and/or control the video capture of the target object. The UI may present a set of 3D paths for capturing videos of the target object from different viewpoints or for capturing different features of the target object in a different sequence, and the user may provide input for selecting (at 304) the particular 3D path.

The particular 3D path starts from a particular point-of-reference on the target object or with the target object at a particular distance, position, and/or orientation The particular 3D path defines a set of 3D positional movements that are offset from and/or change the distance, position, and/or orientation of video capture device 101 relative to the starting capture position of the target object at a fixed or varying rate or speed.

Process 300 includes presenting (at 306) the starting point that is defined for the video capture of the target object in the particular 3D path. Presenting (at 306) the starting point may include generating an augmented reality, mixed reality, or virtual reality view of the starting point overlaid or presented on a current view of the scene that is captured by video capture device 101. In some embodiments, the starting point may be presented on a display of video capture system 100 as a static wireframe, outline, or other visual reference that identifies the starting distance, position, and/or orientation at which the target object is to be captured in the video. The user repositions video capture device 101 until the target object imaged by video capture device 101 is aligned with the presented wireframe, outline, or other visual reference. For instance, video capture system 100 may present an outline of a particular vehicle or vehicle type (e.g., sedan, coupe, truck, sport utility vehicle, etc.) that represents the vehicle or vehicle type from the starting distance, position, and/or orientation, and the user moves video capture device 101 until the actual images of the vehicle are aligned with the presented outline.

The alignment of the video capture device 101 images with a presented wireframe mirrors the operation of using an assistive photography tool to capture a single image of the target object. However, the alignment performed for the assistive video capture differs in that the alignment is used to set the starting point for the subsequent video capture of different features of the target object from different continuous and changing positions according to the guided and controlled sequence specified by the particular 3D path.

Process 300 includes determining (at 308) a positioning of video capture device 101 that aligns with the starting point of the target object based on data obtained from sensors 103 and/or images of the target object captured with video capture device 101. In some embodiments, video capture system 100 uses sensor 103 measurements to determine when the target object is at a starting distance from video capture device 101 and/or when video capture device 101 is at starting position (e.g., tilt, angle, orientation, height, etc.) relative to the target object. In some embodiments, video capture system 100 analyzes the images that are captured by video capture device 101 to determine whether the target object is aligned with a presented wireframe, outline, or starting visual reference for the target object.

Process 300 includes providing (at 310) a notification when the positioning of video capture device 101 aligns with the starting point of the target device. Providing (at 310) the notification may include changing the coloring or other visual characteristics of the wireframe, outline, or visual reference to indicate alignment with the imaged target object. For instance, video capture system 100 may change a presented wireframe to a green color or may present a visual queue (e.g., a checkmark on the display) to indicate that the starting position has been reached and that video recording may commence. The user may manually activate video capture device 101 to begin recording the video of the target object in response to receiving the notification. In some embodiments, providing (at 310) the notification includes automatically starting the video recording in response to determining (at 308) that the positioning of video capture device 101 aligns with the starting point of the target object.

Process 300 includes tracking (at 312) movements of video capture device 101 based on measurements produced by sensors 103 after commencing the video capture. For instance, video capture system 100 may use the gyroscope, accelerometer, LiDAR, inertial measurement unit, and/or other sensor data to determine the direction and degree with which video capture system 100 is tilted or rotated, the direction and amount with video capture device 101 is moved in 3D space or away from a last tracked position, the height of video capture device 101, and/or the distance between video capture device 101 and the target object.

Process 300 includes comparing (at 314) the tracked (at 312) movements to the progression of changes specified by the set of 3D positional movements of the particular 3D path selected for this particular video capture. The set of 3D positional movements specify different movements of video capture device 101 that are to occur at different times throughout the video capture, and video capture system 100 compares (at 314) the tracked (at 312) movements to determine if video capture device 101 is aligned or deviates from the movements specified over the course of the video capture by the particular 3D path.

Process 300 includes determining (at 316) whether the tracked (at 312) movements follow or deviate from the progression of changes specified by a subset of the set of 3D positional movements defined in the particular 3D path for the amount of time that has passed since the video capture began. The tracked (at 312) movements follow the progression of changes and video capture device 101 remains aligned with the particular 3D path when video capture system 100 tracks a position, distance, orientation, and/or other positional attributes of video capture device 101 that match the position, distance, orientation, and/or other positional attributes specified for video capture device 101 by one of the 3D positional movements at the corresponding time in the video capture. The tracked (at 312) movements deviate from the selected 3D path when the current position, distance, orientation, and/or other positional attributes of video capture device 101 deviate from an expected position, distance, orientation, and/or other positional attributes defined in the particular 3D path for the current time of the video capture by more than a threshold amount, or when the offset position and orientation of video capture device 101 from the starting position and orientation of the video capture deviate by more than a threshold amount from the offset position and orientation that is defined by the subset of positional 3D movements from the start time to the current time of the video capture. The position of video capture device 101 may deviate in terms of height, distance from the target object, tilt, angle, relative position, movement speed, and/or other positional aspects.

Process 300 includes providing (at 318) a first output on the display of video capture device 101 in response to determining (at 316—Yes) that the tracked (at 312) movements follow the progression of changes specified by the subset of 3D positional movements for the current position in the video capture. Providing (at 318) the first output may include presenting the UI with the particular 3D path, an indicator along the particular 3D path that shows the current position of the video capture, and/or a first color or visual queue to indicate correct video capture of the target object for the current position of the video capture. The UI may include a live feed of the images or field-of-view being captured by video capture device 101, and/or may include an augmented reality, mixed reality, or video reality view that overlays the UI (e.g., the particular 3D path and positional indicator about the particular 3D path) over the live feed.

Process 300 includes providing (at 320) a different second output on the display of video capture device 101 in response to determining (at 316—No) that the tracked (at 312) movements deviate from the progression of changes specified by the subset of 3D positional movements for the current position in the video capture. Providing (at 320) the second output may include alerting the user of the deviation from the particular 3D path. In some embodiments, video capture system 100 updates the presentation of the particular 3D path in the UI with a second color or visual queue to indicate the deviation. In some embodiments, video capture system 100 calculates the exact deviation by determining the difference between the expected offset position as defined by the progression of changes specified by the subset of 3D positional movements leading to the current time in the video capture and the actual offset position as determined from sensor 103 data. Video capture system 100 may guide the user in correcting the deviations by presenting the calculated differences on the UI or as part of the augmented reality view.

Figure 4:
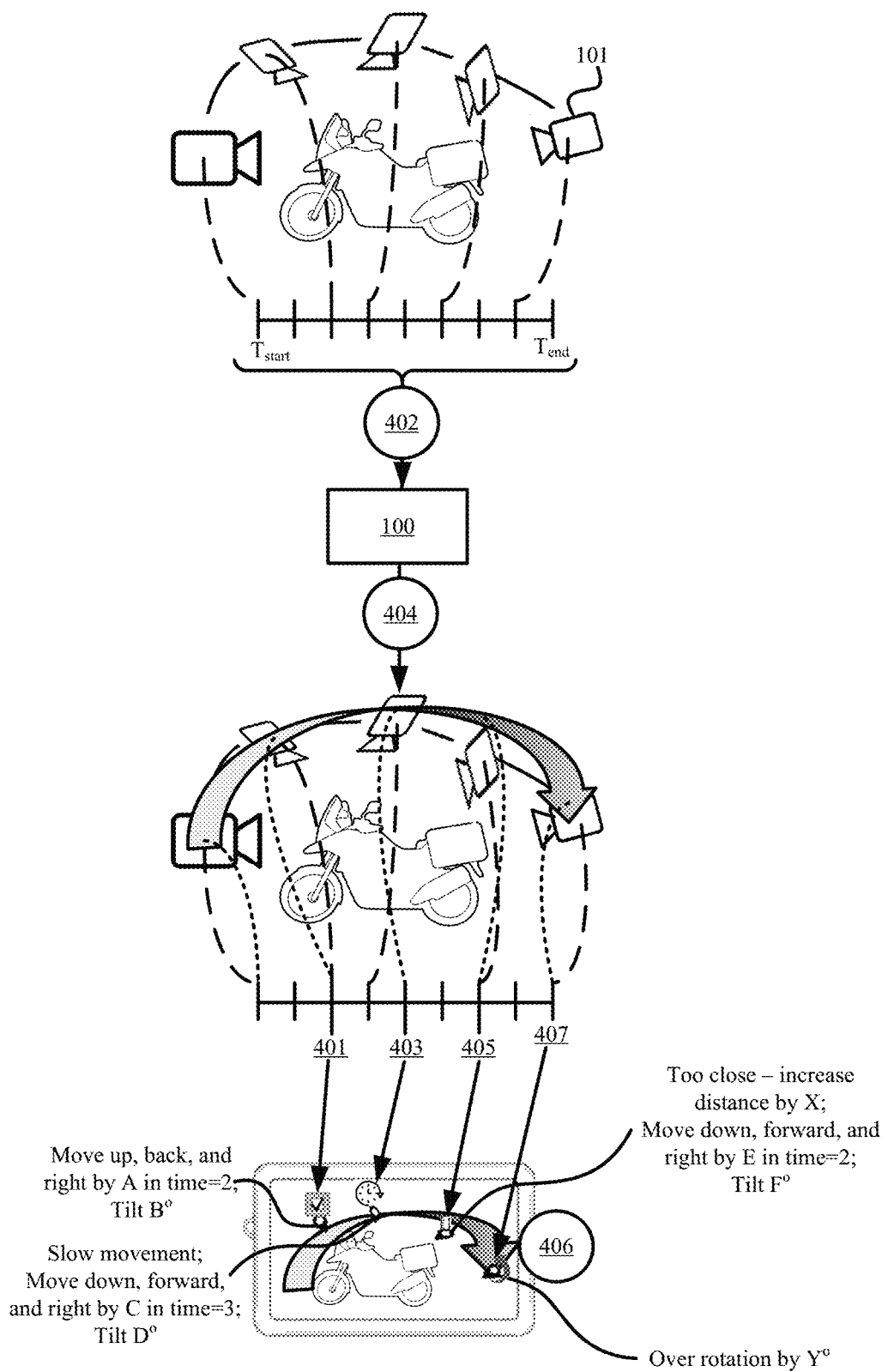
FIG. 4 illustrates an example user interface that is presented at different times during the assistive video capture of a target object in accordance with some embodiments presented herein.

FIG. 4 illustrates an example UI that is presented at different times during the assistive video capture of a target object in accordance with some embodiments presented herein. Video capture system 100 tracks (at 402) the movements of video capture device 101 while video capture device 101 is used to capture a video of the target object.

Video capture system 100 compares (at 404) the tracked (at 402) movements to the offset positioning that is defined for video capture device 101 at corresponding times of the video capture by the selected 3D path. Video capture system 100 updates (at 406) the UI based on the comparisons (at 404) to guide the user in capturing a video of the target object according to the different positions, angles, distances, and perspectives at the different times specified throughout the selected 3D path. The UI updates (at 406) may include identifying the position of video capture device 101 relative to the selected 3D path and/or providing instructions for moving video capture device 101 in conformance with next 3D positional movements specified in the selected 3D path.

Video capture system 100 determines that the tracked movements of video capture device 101 at first time 401 adhere to or follow the movements that were defined for video capture device 101 by the selected 3D path up to first time 401. Accordingly, video capture system 100 updates (at 406) the UI at first time 401 to present the current image or images of the target object as captured by video capture device 101 at the first offset position from the starting position of the video capture, an augmented reality overlay that shows the 3D form of the selected 3D path for the user to follow, an indicator along the visualization of the selected 3D path that indicates the current position of the video capture within the selected 3D path, and a first coloring or representation to identify that the video capture is compliant with the positioning that is specified in the selected 3D path for video capture device 101 at first time 401.

At second time 403, video capture system 100 determines that video capture device 101 has moved past a feature of the target object before the time specified in the selected 3D path and/or the 3D positional movements defined in the selected 3D path for moving past that feature. Video capture system 100 updates (at 406) the UI at second time 403 to notify the user to slow down and realign the positioning of video capture device 101 with the positioning indicated on the selected 3D path.

At third time 405, video capture system 100 determines that the tracked movements of video capture device 101 place video capture device 101 at a position that is a threshold amount closer to the target object than is specified in the selected 3D path. Video capture system 100 updates (at 406) the UI at third time 405 to identify the 3D path deviation. For instance, video capture system 100 changes the overlay of the selected 3D path from a first color (e.g., green) to a second color (e.g., red) to indicate that video capture device 101 has moved off the selected 3D path at third time 405. Video capture system 100 may also update the overlay so that the indicator for the position of video capture device 101 is presented with the determined deviation from the selected 3D path. Specifically, video capture system 100 positions the indicator for the position of video capture device 101 off and below the corresponding position on the selected 3D path to indicate that video capture device 101 is positioned too close to the target object. Video capture system 100 also presents an amount by which the height or distance of video capture device 101 should be increased. The height or distance correction may be calculated as the difference between the current tracked height or position of video capture device 101 and the height or position that is specified for video capture device 101 by the subset of 3D positional movements defined in the selected 3D path from the starting time to third time 405.

At fourth time 407, video capture system 100 determines that the tracked movements of video capture device 101 deviate from the selected 3D path because of an over rotation of video capture device 101. Video capture system 100 updates (at 406) the UI by turning or rotating the selected 3D path in the direction that is opposite to the over rotation. Accordingly, video capture system 100 updates (at 406) the selected 3D path in real-time to identify adjusted movements of video capture device 101 that restore video capture device 101 to the positioning specified for the video capture of the target object at third time 405.

Video capture system 100 differs from photography assistive tools in that video capture system 100 continually tracks the positioning of video capture device 101 based on sensor 103 output, and continually updates the 3D path that video capture device 101 is to follow for next frames of the video based on the tracked positioning. Although a photography assistive tool may monitor the positioning of an imaging device, it does so to provide instructions to align and capture a single view of the target object from a specific distance, position, angle, or perspective. Video capture system 100 determines the current positioning at which a current view of the target object is captured, determines the difference between the current positioning and next positioning specified for a different next view of the target object in the video capture, adjusts the 3D path and/or instructions presented to the user to specify the movements to transition from the current positioning to the next positioning, and continually adjusts the 3D path in real-time until the video capture of the target object from the different distances, positions, angles, and/or perspectives defined in the 3D path is complete.

Video capture system 100 also differs from a panorama generation tool. A panorama generation tool compares a last image with a current image to determine if overlapping parts of the images are aligned along the same plane or height. If not, the panorama generation tool alerts the user to raise or lower the imaging device while continuing to move in the direction of the desired panorama. Accordingly, the panorama generation tool only provides two-dimensional corrections or corrections about a single plane, whereas video capture system 100 provides 3D corrections for correcting not only the height of video capture device 101, but also the orientation, distance, and position of video capture device 101 relative to the target object in 3D space. Moreover, the panorama generation tool may use image analysis (e.g., comparing overlapping regions of a set of images) as the sole basis for determining if the imaging device has deviated off course. Video capture system 100 bases the positional tracking on sensor 103 data in order to more accurately track the positioning of video capture device 101 in 3D space with greater precision relative to the target device and/or the exact positional offsets defined by the set of 3D positional movements from the selected 3D path. Moreover, none of the photography assistive tools and panorama generation tools provide a 3D path that specifies a sequence of video capture device 101 movements, orientations, and positions in 3D space at different times. In other words, the prior art does not provide a 3D path that is temporally bound and that provides a choreographed and continuous sequence of movements from a starting position to an ending position that capture different features of a target object from different positions or vantage points.

Video capture system 100 may postprocess a captured video and adjust one or more frames to correct certain deviations that may have occurred in those one or more frames during the video capture rather than force the user to capture the video anew without any deviations from the selected 3D path. In some embodiments, video capture system 100 analyzes the frames of the video capture relative to the 3D path that was used to guide that video capture. For instance, video capture system 100 tracks movements of the target object between frames, and derives the positional movements that were applied to video capture device 101 and that cause the changes to the target object in the corresponding frames of the video capture. In some other embodiments, video capture system 100 may associate sensor 103 data that is generated at different times during the video capture to the frames of the video capture that were captured at those same times. In other words, sensor 103 data may be stored with each frame or subset of frames of the video capture so that the positional movements of video capture device 101 may be recreated or traced during video playback. Video capture system 100 may then use the tracked positional movements to determine where and/or when the positioning of video capture device 101 deviated from the positioning specified in the selected 3D path, identify the associated frames, and postprocess the associated frames to correct for the detected deviations.

Figure 5:
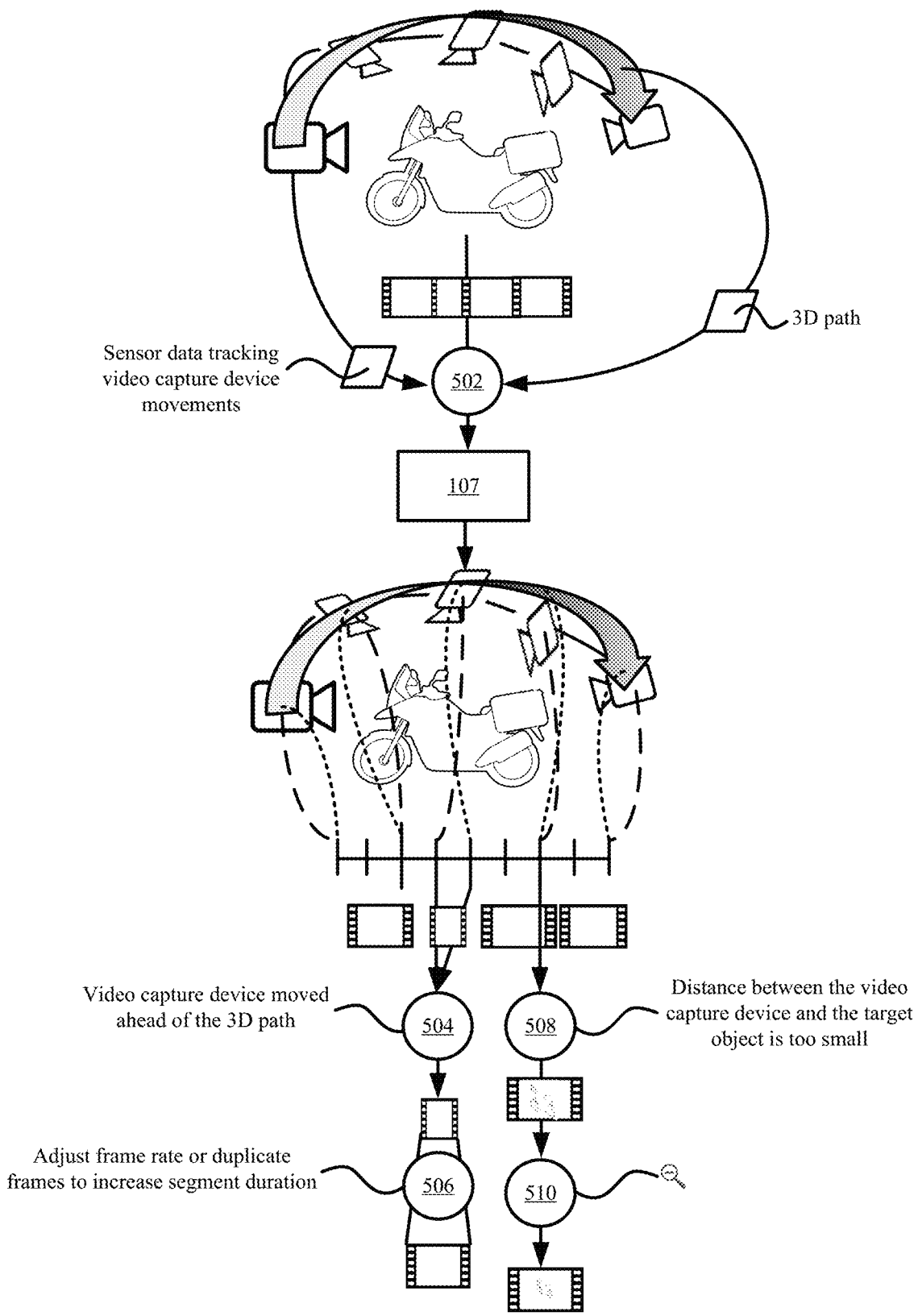
FIG. 5 illustrates an example of postprocessing a video to correct for deviations between the tracked path of a video capture device and the 3D path that was used to guide the video capture in accordance with some embodiments presented herein.

FIG. 5 illustrates an example of postprocessing a video to correct for deviations between the tracked path of video capture device 101 and the 3D path that was used to guide the video capture in accordance with some embodiments presented herein. The postprocessing may be performed by video capture system 100, and more specifically, by video postprocessor 107 of video capture system 100.

Video postprocessor 107 receives (at 502) a captured video of a target object, sensor 103 data that tracked movements of video capture device 101 during and/or throughout the video capture, and the selected 3D path that guided the video capture. In some embodiments, sensor 103 data is embedded as part of the video capture. For instance, sensor 103 data may be stored as metadata of each video frame or in frames of the video that correspond to times when that sensor 103 data was generated. If sensor 103 data was generated every half a second, and the video was captured at 30 frames per second, then every 15$^{th}$ frame of the video capture may be encoded with sensor 103 data that was generated at that time in the video capture.

Video postprocessor 107 detects (at 504) a first deviation between the tracked positional movements of video capture device 101 and a first subset of the 3D positional movements specified in the selected 3D path at a first time in the video spanned by a first subset of frames. The first deviation involves video capture device 101 moving faster from a first position to a second position than is specified by the first subset of 3D positional movements.

Video postprocessor 107 corrects (at 506) the first deviation by adjusting the rate at which the first subset of frames representing the movement from the first position to the second position are played back. For example, the video may capture the movement over a 1 second interval, and the first subset of 3D positional movements may specify completing the movement over a 2 second interval. In this example, video postprocessor 107 identifies the first subset of frames that represent the movement over the 1 second interval, and slows the playback rate of those frames by a factor of 2. Alternatively, video postprocessor 107 may duplicate each frame from the first subset of frames so that the frame rate of the video is not modified but the playback of the movement from the first position to the second position occurs over the desired 2 second interval.

Video postprocessor 107 detects (at 508) a second deviation between the tracked positional movements of video capture device 101 and a second subset of the 3D positional movements specified in the selected 3D path at a second time in the video spanned by a second subset of frames. The second deviation involves video capture device 101 being closer to the target object than the position specified by the second subset of the 3D positional movements.

Video postprocessor 107 corrects (at 510) the second deviation by adjusting the zoom depth at which the second subset of frames are rendered. To increase the distance between video capture device 101 and the target object and align with the distance that was specified by the second subset of the 3D positional movements, video postprocessor 107 may zoom out from the second subset of frames. Zooming out from the second subset of frames simulates an increase in the distance between video capture device 101 and the target object.

Video postprocessor 107 may perform other adjustments or corrections to different frames of a video that capture a target object in a manner that deviates from the subset of 3D positional movements defined for that part of the video in the selected 3D path. The other adjustments may include cropping parts of one or more frames that are captured at a different height than what is specified in the selected 3D path, tilting, rotating, and/or otherwise transforming a frame that is captured with a video capture device 101 orientation that differs from an orientation specified by the 3D positional movement specified for that frame in the selected 3D path.

In some embodiments, video postprocessor 107 generates a single composite video of a target object from different videos that capture different elements or views of the target object. For instance, a user may utilize video capture system 100 to capture multiple videos of the same vehicle with each video following a different 3D path. The multiple videos may be provided as input to video postprocessor 107 for creation of a single composite video of the vehicle.

Video postprocessor 107 may receive a composite video definition file that specifies an ordering with which to stitch together the multiple videos of the vehicle. Video postprocessor 107 stitches the videos according to the specified ordering, and generates transitions between each video. The transitions may include fading the last few seconds of a video into black and fading the first few seconds of a video from black. Other transitions may be used to smooth the switch between the different videos.

The composite video definition file may also include text that is keyed to the different videos, frames of the different videos, and/or different segments of the composite video. Video postprocessor 107 may execute a text-to-speech tool to generate audio from the included text and to integrate the audio as part of the composite video. Accordingly, video postprocessor 107 may incorporate a machine-generated narration of the video and/or features of the target object shown in the stitched videos forming the composite video.

In addition to text, the composite video definition file may be defined with identifiers for different effects that video postprocessor 107 may introduce in the composite video. The identifiers may specify the transition to apply between two videos that are stitched together, or visual and/or audio effects to insert at specific frames of the composite video.

Figure 6:
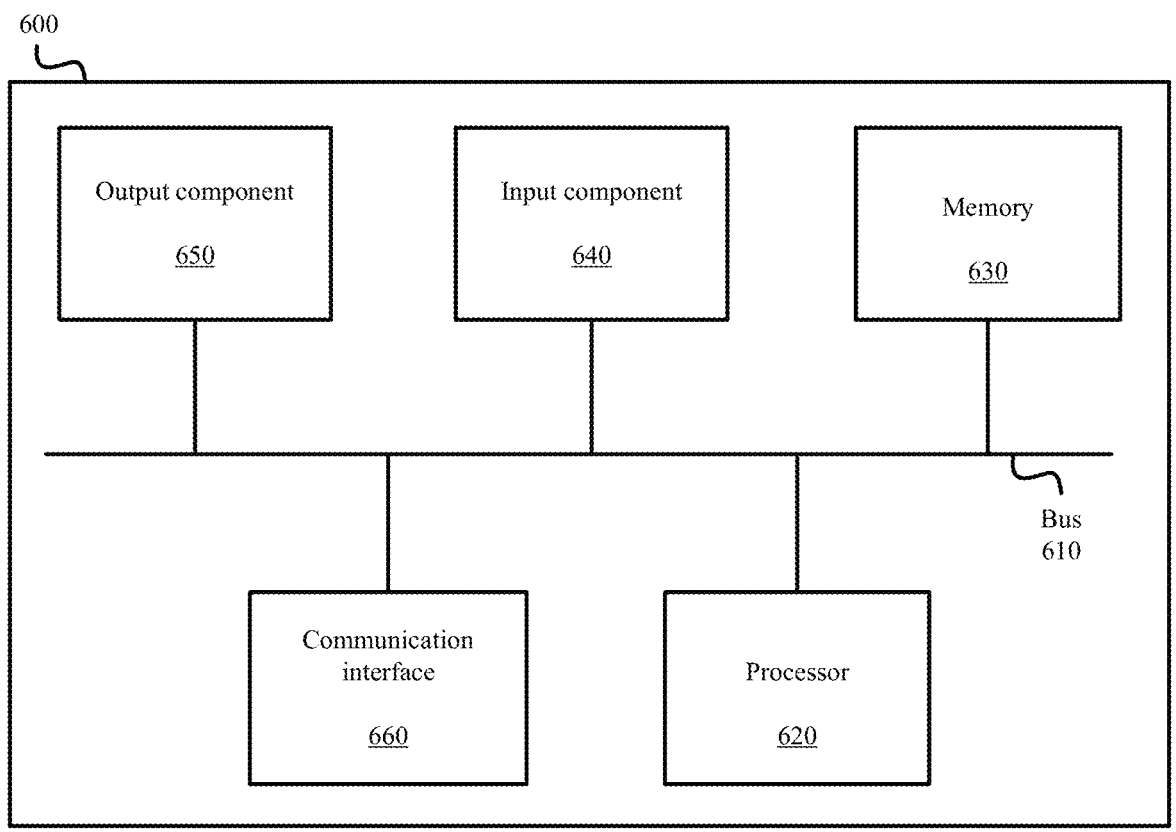
FIG. 6 illustrates example components of one or more devices, according to one or more embodiments described herein.

FIG. 6 is a diagram of example components of device 600. Device 600 may be used to implement one or more of the devices or systems described above (e.g., video capture system 100, video capture device 101, guidance controller 105, video postprocessor 107, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
selecting a three-dimensional ("3D") path that is defined with a plurality of 3D positional movements for guiding a video capture of a target object from different positions;
tracking movements of a video capture device performing the video capture of the target object based on data that is collected from one or more sensors associated with the video capture device;
comparing the movements of the video capture device at different times of the video capture to positions that are specified for the video capture at those different times by different sets of the plurality of 3D positional movements; and
updating a user interface according to the movements of the video capture device following or deviating from the different positions that are specified for the video capture at the different times.

2. The method of claim 1, wherein updating the user interface comprises:
presenting a visual representation of the 3D path in the user interface;
presenting an indicator about the visual representation based on a progression through the 3D path that is tracked by the movements of the video capture device and an amount by which the movements of the video capture device deviate from the plurality of 3D positional movements at corresponding positions about the 3D path.

3. The method of claim 1, wherein updating the user interface comprises:
presenting the 3D path in the user interface with a first visual representation in response to the movements of the video capture device at a first time following a first position that is specified for the video capture at the first time by a first subset of the plurality of 3D positional movements; and
presenting the 3D path in the user interface with a second visual representation in response to the movements of the video capture device at a second time deviating from a second position that is specified for the video capture at the second time by a second subset of the plurality of 3D positional movements.

4. The method of claim 1 further comprising:
presenting images of the target object as captured by the video capture device in the user interface with a visual representation of the 3D path and a tracked position of the video capture device along the 3D path.

5. The method of claim 1, wherein each 3D positional movement of the plurality of 3D positional movements defines an adjustment to a position of the video capture device and an orientation for the video capture device.

6. The method of claim 1, wherein the one or more sensors comprises one or more of a gyroscope, accelerometer, inertial measurement units, and Light Detection and Ranging ("LiDAR") sensor.

7. The method of claim 1 further comprising:
determining an orientation of the video capture device at the different times based on the data that is collected from the one or more sensors; and
determining a 3D position of the video capture device at the different times based on the data that is collected from the one or more sensors.

8. The method of claim 1,
wherein tracking the movements of the video capture device comprises determining a particular position of the video capture device at a particular time during the video capture based on the data that is collected from the one or more sensors; and
wherein updating the user interface comprises presenting a positional adjustment in the user interface that realigns the video capture device with a position that is specified for the video capture device in the 3D path for that particular time.

9. The method of claim 8 further comprising:
computing the positional adjustment based on a difference between the particular position and the position that is specified for the video capture device at the particular time by one or more of the plurality of 3D positional movements.

10. The method of claim 1,
wherein tracking the movements of the video capture device comprises determining an orientation of the video capture device at a particular time during the video capture based on the data that is collected from the one or more sensors;
wherein comparing the movements comprises determining that the orientation of the video capture device at the particular time deviates from a desired orientation specified by one or more of the plurality of 3D positional movements associated with the particular time; and
wherein updating the user interface comprises presenting a rotation in the user interface based on a difference between the orientation of the video capture device and the desired orientation.

11. The method of claim 1, wherein updating the user interface comprises:
changing a shape of the 3D path in the user interface based on an amount with which a position of the video capture device at a particular time during the video capture differs from a position specified in the 3D path for that particular time.

12. The method of claim 1 further comprising:
presenting a representation for a starting point of the video capture in the user interface; and
starting the video capture in response to detecting that the video capture device is aligned with the starting point.

13. The method of claim 12, wherein presenting the representation comprises displaying a guide that illustrates the target object from a particular distance, position, and orientation.

14. The method of claim 13 further comprising:
comparing images that are captured by the video capture device to the guide; and
detecting that the video capture device is aligned with the starting point in response to an image that is captured by the video capture device presenting the target object from a distance, position, and orientation that matches the particular distance, position, and orientation of the guide by a threshold amount.

15. A video capture system comprising:
one or more sensors;
a video capture device; and
one or more hardware processors configured to:
select a three-dimensional ("3D") path that is defined with a plurality of 3D positional movements for guiding a video capture of a target object from different positions;
track movements of the video capture device performing the video capture of the target object based on data that is collected from the one or more sensors;
compare the movements of the video capture device at different times of the video capture to positions that are specified for the video capture at those different times by different sets of the plurality of 3D positional movements; and
update a user interface according to the movements of the video capture device following or deviating from the different positions that are specified for the video capture at the different times.

16. The video capture system of claim 15, wherein updating the user interface comprises:
presenting a visual representation of the 3D path in the user interface;
presenting an indicator about the visual representation based on a progression through the 3D path that is tracked by the movements of the video capture device and an amount by which the movements of the video capture device deviate from the plurality of 3D positional movements at corresponding positions about the 3D path.

17. The video capture system of claim 15, wherein updating the user interface comprises:
presenting the 3D path in the user interface with a first visual representation in response to the movements of the video capture device at a first time following a first position that is specified for the video capture at the first time by a first subset of the plurality of 3D positional movements; and presenting the 3D path in the user interface with a second visual representation in response to the movements of the video capture device at a second time deviating from a second position that is specified for the video capture at the second time by a second subset of the plurality of 3D positional movements.

18. The video capture system of claim 15, wherein the one or more hardware processors are further configured to:

present images of the target object as captured by the video capture device in the user interface with a visual representation of the 3D path and a tracked position of the video capture device along the 3D path.

19. The video capture system of claim 15, wherein tracking the movements of the video capture device comprises determining a particular position of the video capture device at a particular time during the video capture based on the data that is collected from the one or more sensors; and wherein updating the user interface comprises presenting a positional adjustment in the user interface that realigns the video capture device with a position that is specified for the video capture device in the 3D path for that particular time.

20. A non-transitory computer-readable medium storing program instructions that, when executed by one or more hardware processors of a video capture system, cause the video capture system to perform operations comprising:

selecting a three-dimensional ("3D") path that is defined with a plurality of 3D positional movements for guiding a video capture of a target object from different positions;

tracking movements of a video capture device performing the video capture of the target object based on data that is collected from one or more sensors associated with the video capture device;

comparing the movements of the video capture device at different times of the video capture to positions that are specified for the video capture at those different times by different sets of the plurality of 3D positional movements; and updating a user interface according to the movements of the video capture device following or deviating from the different positions that are specified for the video capture at the different times.

* * * * *